May 27, 1952  G. GRANDI  2,598,369
BELT BUCKLE
Filed March 8, 1949
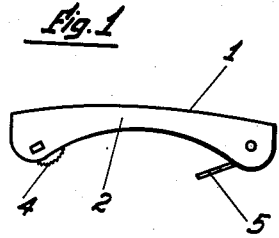
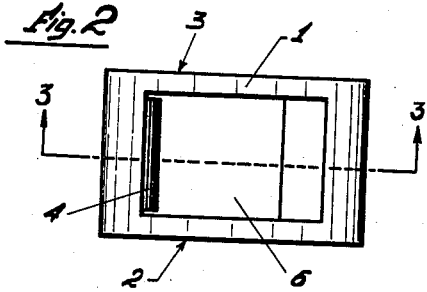
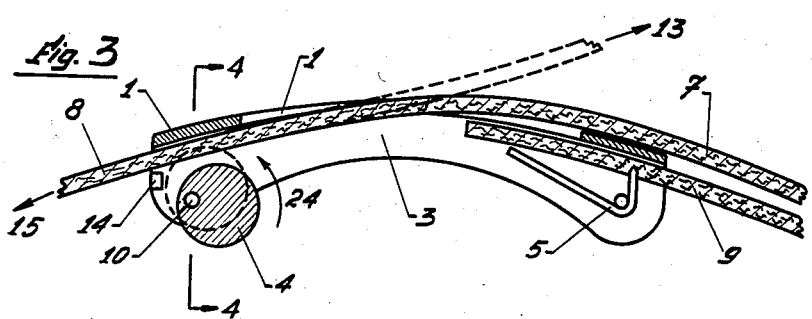
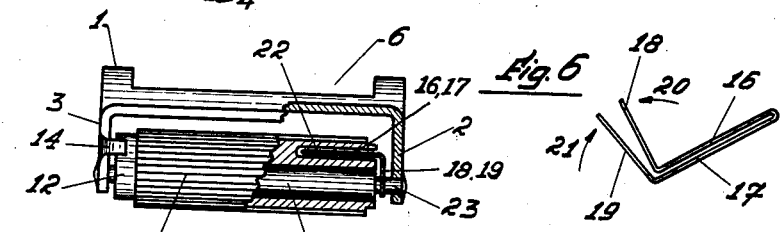
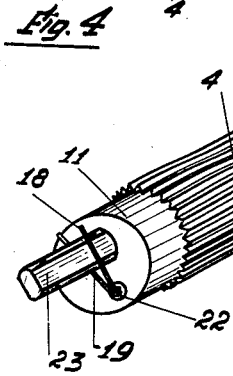
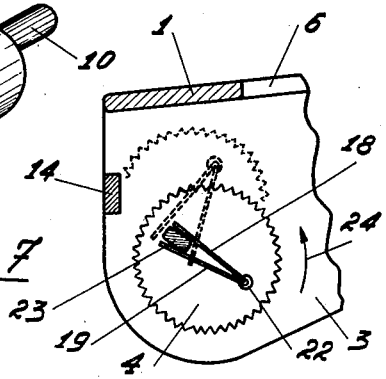
INVENTOR.
Giuseppe Grandi
BY Patented May 27, 1952

2,598,369

UNITED STATES PATENT OFFICE 2,598,369

BELT BUCKLE

Giuseppe Grandi, Milano, Italy

Application March 8, 1949, Serial No. 80,338
In Italy March 12, 1948

2 Claims. (Cl. 24—170)

The present invention relates to a belt buckle for trouser belts or the like for clasping the ends of a belt together in any convenient position without the use of movable members to be inserted into holes or eyelets in the belt.

The main object of the invention, therefore, is the provision of means exerting a pressure on the back of the belt in order to assure a proper clasping effect, but at the same time not damaging and wearing out the surface of both sides of said belt.

Another object of the invention is the provision of means for clasping a belt which does not cause the formation of bents of small radius in the material leading to permanent deformation of fibers.

A further object of the invention is to provide elastic means for opening said clasping device in order to keep it opened to allow the quick and easy insertion of the free end of the belt into the device.

A still further object of the invention is a particular shape of the clasping device preventing pressure against the two edges of the belt, in order to avoid useless wearing out of material after prolonged use of the belt.

The above objects of the invention are accomplished by the device as illustrated in the accompanying drawings in which:

Fig. 1 is a side view of the device;
Fig. 2 is a front view of the same device;
Fig. 3 is a sectional view of the device on the section line 3—3 of Fig. 2, on enlarged scale;
Fig. 4 is a partly sectional side view of the same device on the side on which the free end of the belt is inserted, shown on the same enlarged scale as Fig. 3, the left-hand side of the device being shown in section on the section line 4—4 of Fig. 3;
Fig. 5 represents a perspective enlarged view of a part of the device showing a roller and a shaft provided with elastic means;
Fig. 6 is a perspective view of a spring forming a part of the device; and
Fig. 7 illustrates diagrammatically the method of operation of the spring shown in Fig. 6.

The body or frame of the device consists of a plate, preferably made of metal, composed of front wall 1 of the buckle, and the bent side walls 2 and 3 which are supporting a roller 4, constituting the clasping means of the belt, and the lever fastening tongue 5, constituting the fastening means of the belt at the end where it generally has to be fastened permanently to the clasping device. Said fastening lever tongue 5 is in itself known and may be replaced by any other suitable means for holding firmly one end of the belt.

The front wall 1 of the device is provided with an aperture 6, for the insertion of the free end 7 of the belt 8, whose other end 9 is fastened to the device by the above said tongue 5. In other embodiments of this invention, the aperture may be omitted, and in this case the free end of the belt is to be placed against the back of the other end 9. The front face of the buckle 1 may be suitably decorated with engravings or the like.

Said roller 4 is rotatable around a small shaft or pivot 10, eccentrically inserted in said roller 4, and on its outside surface provided with corrugations, similar to sharp longitudinal teeth or the like, so as to assure sufficient friction against the back of the belt 8. To avoid the wearing out of the edges of the belt, the side portions of the roller 4 are preferably free from such corrugations.

The method of operation of the roller 4 in the belt buckle is clearly shown in Fig. 3. When the roller is in the hatched position, the belt 8 can be freely inserted between the roller surface and the back of part 1 and then the belt can be fastened at the required length, by pulling the belt end 7 in the direction of the arrow 13; as said action is terminated, said belt end 7 moves backwardly and the friction created between the back of the belt and the roller surface 4 causes rotation of said roller 4 on its pivot 10 in the direction shown by arrow 24. During rotation of the eccentric roller the roller surface approaches the inside part of plate 1 of the device, as shown in Fig. 3 with a dotted circle, and also shown in Fig. 4. In this manner it is possible to obtain a perfect clamping of the belt 8 between the roller and the inside part of plate 1 of the device, thus securing good holding of the belt in any desired position. As it can be seen, rotation of the roller 4 is limited by the stop pin 14, which may be obtained by bending at right angles a small portion on the side wall 3. In any case, the position which can be reached by the roller 4 is sufficient to tighten the belt 8 so as to resist the stresses applied in the direction of the arrow 15.

When it is desired to slacken the belt, or to take it off, it is sufficient to actuate the roller 4, by a simple and easy movement, which can be effected by one hand, so as to bring said roller 4 in the position shown in Fig. 3.

In order that the roller 4 may be maintained in its position corresponding to the greatest distance from the back side of plate 1, permitting easy insertion of the free end of the belt, the invention uses a spring device as illustrated in Figs. 5, 6 and 7. This device consists in one small steel wire spring, see detail in Fig. 6, forming two parallel members 16, 17, having their opposite ends 18, 19 bent in such a manner as, owing to the elastic material employed, to have the tendency to approach each other in the directions shown by arrows 20 and 21.

The two spring members 16, 17 are fitted into a hole 22 formed in the head of the roller 4, while portions 18, 19 are placed against the sides of the end 23 of the eccentric shaft 10, the latter end being machined to offer two opposed flattened abutment surfaces, the section of said end 23 having almost rectangular shape. Said shaft 10 is prevented from rotation inasmuch as its end 23 is inserted in a hole equally shaped, formed in the side wall 2 of the frame, or said shaft may be supported in any other suitable way.

The right position of the shaft 10 is determined in such a manner that when roller 4 is in its position corresponding to the greatest distance from the back surface of part 1, the ends 18 and 19 of the forked spring device abut against the flat surfaces of the end 23 of shaft 10; therefore, roller 4 is automatically kept in this position, since any rotation would increase the distance between the portions 18 and 19. The method of operation of the elastic device can be understood from Fig. 7, where roller 4 is in the position for insertion of the belt, while the tightening position is indicated with broken lines.

Obviously, the present invention may be modified by using different types of elastic roller claspings known in the art, for instance, by using springs to be inserted into slots made in the roller or in its shaft, by small springs urging the roller to its open position, and so forth.

I am aware that prior to my invention different clasping devices for trousers belts or the like have been constructed, including devices permitting the tightening of the belt at different portions; I therefore do not claim such device broadly.

What I claim is:

1. A buckle for clasping the free end of a belt or the like comprising a body portion having a front wall and a pair of depending side walls; a shaft fixedly mounted between said side walls at one end of said body portion; a roller rotatably and eccentrically mounted on said shaft for movement toward and away from the underside of said front wall; a pair of opposed abutment surfaces formed at one end of said shaft; and a forked spring member secured to a respective end of said roller and having a pair of arms normally engaging said abutment surfaces for releasably maintaining said roller in its position of maximum separation from the underside of said front wall in order to allow insertion of the free end of the belt between the underside of said front wall and said roller.

2. A buckle for clasping the free end of a belt or the like comprising a body portion having a front wall and a pair of depending side walls; a shaft fixedly mounted between said side walls at one end of said body portion; a roller rotatably and eccentrically mounted on said shaft for movement toward and away from the underside of said front wall; a pair of opposed abutment surfaces formed at one end of said shaft; and a forked spring member secured to a respective end of said roller and having a pair of arms normally engaging said abutment surfaces for releasably maintaining said roller in its position of maximum separation from the underside of said front wall in order to allow insertion of the free end of the belt between the underside of said front wall and said roller, said roller having a plurality of longitudinal corrugations along the surface thereof for frictionally engaging the free end of the belt in inserted position between the underside of said front wall and said roller.

GIUSEPPE GRANDI.

REFERENCES CITED

The following references are of record in the file of this patent:

UNITED STATES PATENTS

| Number | Name | Date |
|---|---|---|
| 48,610 | White | July 4, 1865 |
| 50,017 | Maine | Sept. 19, 1865 |
| 342,110 | Kjellstrom | May 18, 1886 |

FOREIGN PATENTS

| Number | Country | Date |
|---|---|---|
| 714,940 | France | Sept. 14, 1931 |
| 731,369 | France | May 30, 1932 |